(12) United States Patent
Kutsovsky et al.

(10) Patent No.: US 7,829,057 B2
(45) Date of Patent: Nov. 9, 2010

(54) CARBON BLACK AND MULTI-STAGE PROCESS FOR MAKING SAME

(75) Inventors: Yakov E. Kutsovsky, Arlington, MA (US); William L. Sifleet, Clinton, MA (US); Sheldon B. Davis, Nashua, NH (US); Francois M. Terrade, Rueil Malmaison (FR); Gregory T. Gaudet, Acton, MA (US)

(73) Assignee: Cabot Corporation, Boston, MA (US)

( * ) Notice: Subject to any disclaimer, the term of this patent is extended or adjusted under 35 U.S.C. 154(b) by 618 days.

(21) Appl. No.: 10/838,530

(22) Filed: May 4, 2004

(65) Prior Publication Data

US 2005/0249657 A1    Nov. 10, 2005

(51) Int. Cl.
*C09C 1/48* (2006.01)
*C01D 3/00* (2006.01)

(52) U.S. Cl. .................. 423/450; 423/449.1
(58) Field of Classification Search .............. 423/449.1, 423/450–457
See application file for complete search history.

(56) References Cited

U.S. PATENT DOCUMENTS

| | | | |
|---|---|---|---|
| 3,201,200 A | 8/1965 | Voet et al. | |
| 3,203,765 A | 8/1965 | Iannicelli | |
| 3,306,761 A | 2/1967 | Johnson | |
| 3,307,911 A | 3/1967 | Krejci | |
| 3,523,812 A * | 8/1970 | Kraus | 106/478 |
| 3,717,494 A | 2/1973 | Jager et al. | 106/307 |
| 3,864,455 A * | 2/1975 | Vanderveen | 423/450 |
| 3,867,513 A | 2/1975 | Krejci | 423/450 |
| 3,952,087 A | 4/1976 | Antonsen et al. | |
| 4,035,336 A | 7/1977 | Jordan et al. | |
| 4,093,705 A | 6/1978 | Kraus et al. | 423/450 |
| 4,105,750 A | 8/1978 | Horn et al. | |
| 4,148,744 A | 4/1979 | Hunt et al. | 252/182 |
| 4,213,957 A | 7/1980 | Hunt et al. | 423/450 |
| 4,327,069 A | 4/1982 | Cheng | |
| 4,351,815 A | 9/1982 | Glasstetter et al. | 423/445 |
| 4,370,308 A | 1/1983 | Williams et al. | 423/450 |
| 4,383,973 A * | 5/1983 | Cheng | 422/151 |
| 4,391,789 A | 7/1983 | Estopinal | 423/457 |
| 4,636,375 A | 1/1987 | Rothbühr et al. | 423/450 |
| 4,822,588 A | 4/1989 | Gravley et al. | 423/450 |
| 4,879,104 A | 11/1989 | List et al. | |
| 4,976,945 A * | 12/1990 | Kanamaru et al. | 423/450 |
| 5,190,739 A * | 3/1993 | MacKay et al. | 423/450 |
| 5,622,557 A * | 4/1997 | Mahmud et al. | 106/712 |
| 5,869,550 A * | 2/1999 | Mahmud et al. | 523/215 |

(Continued)

FOREIGN PATENT DOCUMENTS

EP    1 078 960 A1    2/2001

(Continued)

OTHER PUBLICATIONS

Octave Levenspiel, Chemical Reaction Engineering, 207 (3d ed. John Wiley & Sons, Inc. 1999).*

(Continued)

*Primary Examiner*—Stanley S. Silverman
*Assistant Examiner*—Daniel C. McCracken

(57) ABSTRACT

Methods of producing carbon black in a multi-stage reaction are described. Also described is carbon black formed from the processes.

6 Claims, 1 Drawing Sheet

U.S. PATENT DOCUMENTS

| | | | |
|---|---|---|---|
| 5,877,251 A * | 3/1999 | Sant | 524/496 |
| 5,997,837 A | 12/1999 | Lynum et al. | |
| 6,017,980 A | 1/2000 | Wang et al. | 523/215 |
| 6,056,933 A | 5/2000 | Vogler et al. | |
| 6,099,818 A | 8/2000 | Freund et al. | 423/449.1 |
| 6,153,684 A * | 11/2000 | Shieh et al. | 524/495 |
| 6,228,928 B1 | 5/2001 | Soeda et al. | 524/495 |
| 6,348,181 B1 | 2/2002 | Morgan | 423/449.1 |
| 6,391,274 B1 | 5/2002 | Vogler et al. | 423/275 |
| 6,403,695 B1 * | 6/2002 | Soeda et al. | 524/495 |
| 6,485,693 B1 * | 11/2002 | Morgan | 422/151 |
| 6,548,036 B2 | 4/2003 | Iida et al. | 423/449.1 |
| 6,686,409 B2 * | 2/2004 | Mahmud et al. | 524/492 |
| 2002/0183437 A1 * | 12/2002 | Mahmud et al. | 524/493 |
| 2007/0104636 A1 | 5/2007 | Kutsovsky et al. | |

FOREIGN PATENT DOCUMENTS

| | | |
|---|---|---|
| EP | 1 236 509 A1 | 9/2002 |
| EP | 0 949 303 B1 | 10/2004 |
| JP | 10-172870 | 6/1998 |
| RU | 2087413 | 8/1997 |
| RU | 2198192 | 2/2003 |

OTHER PUBLICATIONS

Richard M. Felder and Ronald W. Rousseau, Elementary Principles of Chemical Processes, "Table B.1" (2d ed. John Wiley & Sons, Inc. 1986).*

Octave Levenspiel, Chemical Reaction Engineering, p. 207 (3d Ed. John Wiley & Sons, Inc. 1999).*

International Search Report for PCT/US2005/015189 dated Apr. 5, 2006.

International Preliminary Report on Patentability and Written Opinion of the International Searching Authority for PCT/US2005/015189 dated Nov. 16, 2006.

English translation of Official Action received in counterpart Russian Patent Application No. 2006139062 dated Apr. 9, 2008 (4 pages).

* cited by examiner

CARBON BLACK AND MULTI-STAGE PROCESS FOR MAKING SAME

BACKGROUND OF THE INVENTION

The present invention relates to carbon black and to processes for making carbon black. More particularly, the present invention relates to unique forms of carbon black and to several multi-stage carbon black forming processes.

The present invention relates to the production of carbon black such as furnace blacks having many important applications, such as fillers, pigments, and reinforcing agents, in rubbers and plastics. Generally, the furnace process for preparing these blacks entails the cracking and/or incomplete combustion of a hydrocarbon feedstock such as natural gas or catalytic cracker cycle stock in a closed conversion zone to produce carbon black. The carbon black entrained in the gases emanating from the conversion zone is then quenched and collected by any suitable means conventionally used in the art. It has, however, been extremely costly to produce carbon blacks having high surface area with increased structure.

U.S. Pat. No. 5,190,739 to MacKay et al. relates, in part, to a process for preparing carbon blacks having lower-than-normal structure at a given surface area and a lower-than-normal surface area at a given overall combustion level. The process can involve the use of a multi-stage furnace wherein a second source of hydrocarbons is added to the stream of hot first-stage gases. Certain embodiments of the '739 patent also relate to the use of potassium to make low structure carbon blacks. However, the amount of the auxiliary hydrocarbons used in the '739 patent are considerably lower amounts than in the first stage. Furthermore, the '739 patent can optionally use additional fuel and/or oxygen to achieve further combustion upon the introduction of the auxiliary hydrocarbons. In addition, there is no significant temperature zone difference between the zone where the first feedstock is introduced and the zone where the auxiliary feedstock is introduced in the '739 patent.

In U.S. Pat. No. 4,383,973 to Cheng, this patent relates to a process which involves two carbon black reactors in sequence where one of the reactors is for a high-structure carbon black and the second is for a low-structure carbon black. In the one figure of the '973 patent, the reactors are apparently connected together in sequence. However, in this process, additional air and fuel are introduced to the second feedstock and there is no significant temperature difference between the two feedstock introduction zones. Further, there is no partial quenching occurring prior to the complete quenching. The '973 patent further states that there is no quenching occurring between the first and second carbon black forming zones and further 10 ppm or more potassium can be introduced in the high structure zone. Furthermore, with the high combustion occurring in each feedstock introduction zone, there would not be any significant temperature zone difference between the first carbon black of high structure is formed and the zone where the low structure carbon black is formed.

In U.S. Pat. No. 4,976,945, a process for producing carbon black is described which uses various amounts of alkali metal, such as potassium, in a carbon black reactor to regulate structure. The '945 patent does state that an alkali metal compound and/or alkaline earth metal compound can be added in an amount of 500 to 50,000 ppm relative to the hydrocarbon starting material. The '945 patent does not relate to a multi-stage carbon black forming process and shows no partial quenching occurring prior to the complete quenching. The '945 patent further states that an alkali metal compound is particularly effective for the production of carbon black where the DBP absorption is at most 90 cc/100 g.

U.S. Pat. No. 4,822,588 to Gravely et al. relates to a carbon black reactor which has a first reaction zone and a second reaction zone that are serially connected. In this process, in the second stage, additional carbonaceous feedstock is introduced to form a second reaction mixture. In this process, the goal was to not substantially form carbon black in the first reaction zone. Also, the process didn't use an alkali metal or alkaline earth metal.

Accordingly, there is a need to provide a novel and improved process for preparing carbon blacks which exhibit improved or increased structure with increased surface area.

All of the patents and publications mentioned throughout are incorporated in their entirety by reference herein.

SUMMARY OF THE PRESENT INVENTION

Figure 1:
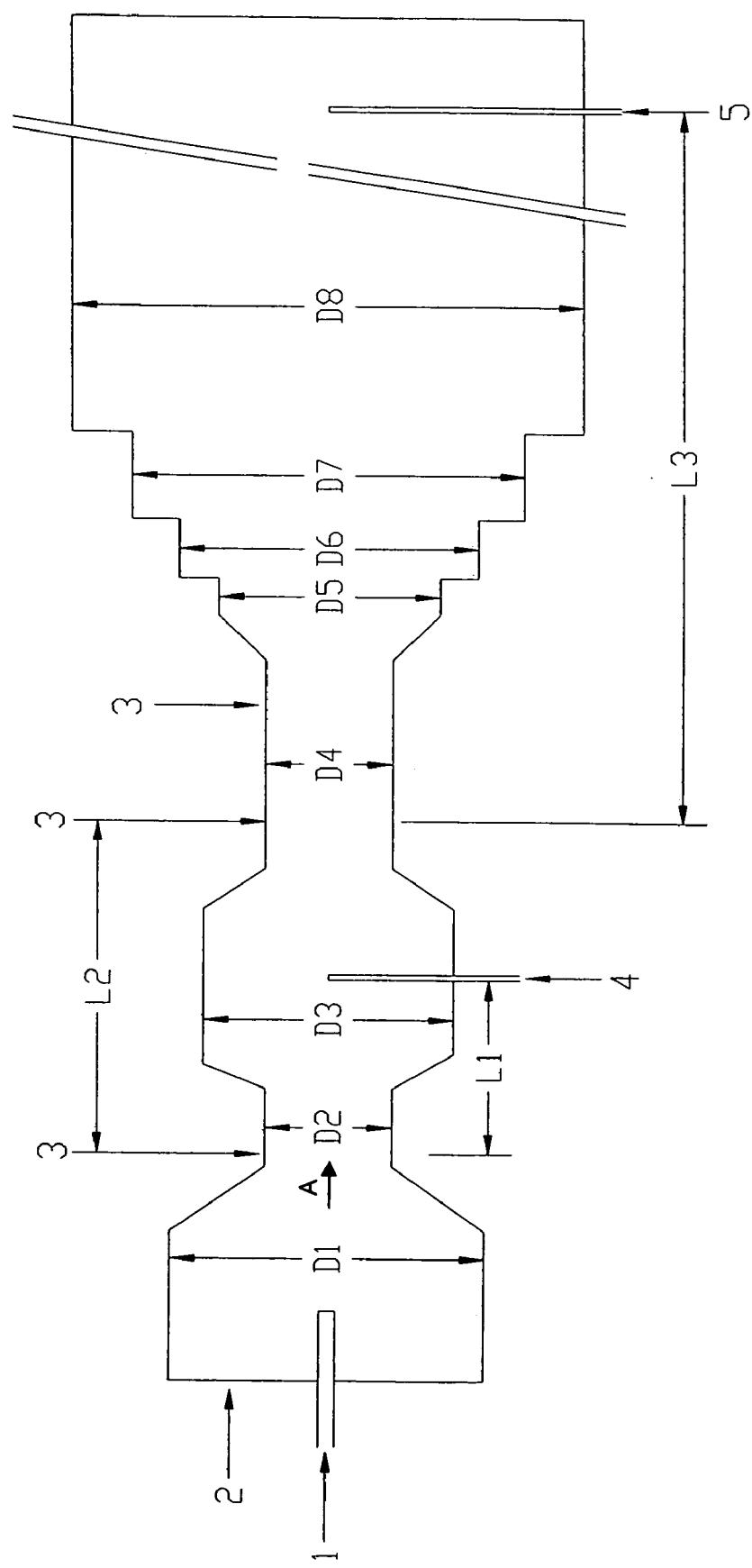
FIG. 1 is cross sectional view of a carbon black reactor that can be used in the present invention.

It is therefore a feature of the present invention to provide a method of producing carbon black with high surface area and high structure.

Another feature of the present invention is to provide a method of producing carbon black which is cost effective.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages and in accordance with the purposes of the present invention, as embodied and broadly described herein, the present invention relates to a method of making a carbon black product. The method includes introducing a carbon black yielding feedstock in a first stage of a carbon black reactor and combining this feedstock with a stream of hot gases to form a precursor which essentially is a first carbon black and optionally byproducts. Then, a second carbon black yielding feedstock is subsequently introduced to the precursor to at least partially quench the reaction stream containing the first carbon black and then the process includes completely quenching to form the carbon black product.

The present invention further relates to a process of making a carbon black product which includes introducing a carbon black yielding feedstock in a first stage of a carbon black reactor and combining this feedstock with a stream of hot gases to form a precursor. The precursor contains a first carbon black. Then, in the process, a second carbon black yielding feedstock is introduced to the precursor, wherein the second carbon black yielding feedstock contains at least 15% by weight of the total amount by weight of the carbon black yielding feedstock utilized during the entire process.

In addition, the present invention relates to a process of making a carbon black product which includes introducing a first carbon black yielding feedstock in a first stage of a carbon black reactor and combining this feedstock with a stream of hot gases to form a precursor which contains a first carbon black. Then, in the process, a second carbon black yielding feedstock is introduced to the precursor, wherein no oxidizing source and no fuel source are introduced after formation of the precursor.

Furthermore, the present invention relates to a process of making a carbon black product which includes forming a precursor which contains a first carbon black in a first temperature zone and then forming a carbon black product from this precursor in a second temperature zone before a quench zone. The first temperature zone and the second temperature zone have a temperature difference of 200° C. or more.

In each of these processes, the process can include the introduction of at least one substance containing at least one Group IA or Group IIA element at one or more locations of the process.

Also, the present invention relates to a carbon black having a DBP range of from about 30 to about 150 cc/100 g with a total Group IA or Group IIA element content of from about 50 to about 5,000 ppm. The carbon black can have other physical or chemical attributes including, but not limited to, a leachable Group IA or Group IIA content, a porosity amount, and desirable t-area such as a t-area of from about 10 to about 180 $m^2/g$. Other characteristics are further described herein.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to carbon black products as well as various methods of making carbon black products. In the preferred embodiments, the methods of making the carbon black product involves the use of a multi-stage carbon black reactor. More preferably, the multi-stage reactor has at least two stages (two, three, four, or more stages) where generally there are at least two feedstock (e.g., two, three, four, or more feedstocks) introductions occurring. The carbon black product is preferably a furnace black.

In more detail, in one embodiment of the present invention, the present invention relates to a method of making a carbon black product which involves introducing a carbon black yielding feedstock in a first stage of a carbon black reactor. The carbon black yielding feedstock is combined with a stream of hot gases to form a precursor. The precursor is or at least contains a first carbon black. A second carbon black yielding feedstock is then subsequently introduced into the carbon black reactor downstream of the first stage and this second carbon black yielding feedstock is preferably introduced in the presence of the precursor formed in the first stage. In this method, the second carbon black yielding feedstock at least partially quenches the reactions that are occurring. Afterwards, the complete quenching can occur downstream, wherein the carbon forming reactions are completely stopped or quenched and a carbon black product is formed.

For purposes of this method as well as the other methods described herein, a multi-stage carbon black reactor can be used such as the ones described in U.S. Pat. No. 4,383,973, U.S. Pat. No. 5,190,739, U.S. Pat. No. 5,877,251, U.S. Pat. No. 6,153,684, or U.S. Pat. No. 6,403,695, all of which are incorporated in their entirety by reference herein. Thus, the present invention can use a multi-stage furnace process.

The carbon black yielding feedstock can be any conventional carbon black yielding feedstock which results in the formation of carbon black. For instance, any hydrocarbon material can be used. A suitable feedstock can be any carbon black-yielding hydrocarbon feedstock which is readily volatilizable under the conditions of the reaction. For example, unsaturated hydrocarbons such as acetylene; olefins such as ethylene, propylene, butylene; aromatics such as benzene, toluene and xylene; certain saturated hydrocarbons; and other hydrocarbons such as kerosenes, naphthalenes, terpenes, ethylene tars, aromatic cycle stocks and the like may be used.

With respect to the stream of hot gases that is combined with the carbon black yielding feedstock, the stream of hot gases can also be considered hot combustion gases that can be generated by contacting a solid, liquid, and/or gaseous fuel with a suitable oxidant stream such as, but not limited to, air, oxygen, mixtures of air and oxygen, or the like. Alternatively, a preheated oxidant stream may be passed through without adding a liquid or gaseous fuel. Examples of the fuel suitable for use in contacting the oxidant stream to generate the hot gases include any of the readily combustible gas, vapor, or liquid streams, such as natural gas, hydrogen, carbon monoxide, methane, acetylene, alcohol, or kerosene. Generally, it is preferred to use fuels having a high content of carbon-containing components and in particular, hydrocarbons. The ratio of air to fuel utilized to produce the carbon blacks of the present invention may be from about 1:1 (stiochiometric ratio) to infinity. As stated, to facilitate the generation of hot gases, the oxidant stream may be preheated.

The general process of forming carbon black through the use of a multi-stage reactor and achieving appropriate hot gases to form carbon black are described in the above-identified referenced patents which are incorporated by reference herein and can be applied in the present invention with the changes described herein. In one embodiment of the present invention, surface area is maximized by maintaining high temperature preferably after introduction of the first carbon black yielding feedstock, such as by no water cooling, rapid mixing of the hot gases with the carbon black yielding feedstock, and/or short mixing lengths, and the like.

The present invention can be practiced using any suitable carbon black producing reactor. FIG. 1, for example, illustrates a cross-section of one example of such a reactor. Reactors of this type generally use a combustion gas which is mixed with an oxidant such as air. The gas mixture is generally introduced into a combustion chamber and ignited by any suitable method. Gas flow is left to right (direction A) in FIG. 1. Once ignited, the hot gas mixture can be moved through the reactor, and brought into contact with a hydrocarbon feedstock suitable for producing carbon black. In FIG. 1, and simply as an example, fuel can be introduced at location 1 and oxidant can be introduced at location 2. Other locations are possible. The first location 3 (one or more) is an example of a point of introduction of the first carbon black yielding feedstock. The second and third location 3 are examples of points of introduction of the second carbon black yielding feedstock. Location 4 is an example of a suitable location of a partial quenching agent, like water. Location 5 is an example of a suitable location for complete quenching. The double parallel lines signify that the reactor can be any length. The various D numbers represent various lengths of the reactor. D1 through D8 can be any suitable diameter and can be the same or different. For instance, D2 can be less than D1 and D8, and D1 and D8 can be the same or different. Zone L1 or zone L2 are examples of the first temperature zone, and zone L3 is an example of the second temperature zone. If a partial quench agent is used at for instance point 4, then the first temperature zone is typically L1.

Generally, carbon black-yielding feedstock can be injected into a reactor by a plurality of streams 3 (in L-2), shown in FIG. 1, which penetrate into the interior regions of the hot combustion gas stream, to insure a high rate of mixing and shearing of the hot combustion gases and the carbon black-yielding feedstock. This insures that the feedstock rapidly and completely decomposes and converts into a first carbon black material.

The precursor formed in the methods described herein contains a first carbon black and can contain other components such as unused fuel or oxidants or combustion products and can also contain other components such as, but not limited to, inorganic substances, metals, salts, and metal oxides. Primarily, the precursor is a carbon black product. For instance, 80 to 99% and, more preferably, 95% to 99% or greater (e.g., 100%) by weight of the precursor is carbon black.

With respect to the subsequent introduction of a second carbon black yielding feedstock to the precursor containing the first carbon black, this second carbon black yielding feedstock is added downstream of the first stage in an amount to at least partially quench the reactions that are still occurring from the first stage. For purposes of the present invention, the partial quenching of the reactions means that this introduction of the second carbon black yielding feedstock is not a complete quenching of the reactions but quenches a portion of the reactions. Preferably, the introduction of the second carbon black yielding feedstock does not completely quench the reactions. The second carbon black yielding feedstock can be the same type of feedstock or a different feedstock from the carbon black yielding feedstock introduced in the first stage.

The above-identified patents provide various carbon black forming conditions and starting amounts that can be used in the formation of the precursor.

The carbon black yielding feedstock introduced in either stage can be introduced in any conventional way such as a single stream or plurality of streams and the introduction of the feedstocks can occur at any rate. With a plurality of streams, the rates for each stream can be the same or different. Preferably, the subsequent introduction of the carbon black yielding feedstock to the precursor is done by a plurality of streams. Any manner in which the second carbon black yielding feedstock can be introduced can be used.

After the mixture of hot combustion gases and carbon black-yielding feedstock is quenched, the cooled gases pass downstream into any conventional cooling and separating means whereby the carbon black is recovered. The separation of the carbon black from the gas stream is readily accomplished by conventional means such as a precipitator, cyclone separator or bag filter. With respect to completely quenching the reactions to form the final carbon black product, any conventional means to quench the reaction downstream of the introduction of the second carbon black yielding feedstock can be used and is known to those skilled in the art. For instance, a quenching fluid can be injected which may be water or other suitable fluids to stop the chemical reaction.

In an embodiment of the present invention, the method further includes introducing at least one substance that is or that contains at least one Group IA or Group IIA element (or ion thereof) of the Periodic Table. Preferably, the substance contains at least one alkali metal or alkaline earth metal. Examples include lithium, sodium, potassium, rubidium, cesium, francium, calcium, barium, strontium, or radium, or combinations thereof. Any mixtures of one or more of these components can be present in the substance. The substance can be a solid, solution, dispersion, gas, or any combinations thereof. More than one substance having the same or different Group IA or Group IIA metal can be used. If multiple substances are used, the substances can be added together, separately, sequentially, or in different reaction locations. For purposes of the present invention, the substance can be the metal (or metal ion) itself, a compound containing one or more of these elements, including a salt containing one or more of these elements, and the like. Preferably, the substance is capable of introducing a metal or metal ion into the reaction that is ongoing to form the carbon black product. For purposes of the present invention, preferably, the substance is introduced prior to the complete quenching as described above. For instance, the substance can be added at any point prior to the complete quenching, including prior to the introduction of the carbon black yielding feedstock in the first stage; during the introduction of the carbon black yielding feedstock in the first stage; after the introduction of the carbon black yielding feedstock in the first stage; prior to, during, or immediately after the introduction of the second carbon black yielding feedstock to the precursor; or any step after the introduction of the second carbon black yielding feedstock but prior to the complete quenching. More than one point of introduction of the substance can be used. Preferably, the introduction of the substance is prior to the introduction of the second carbon black yielding feedstock and/or during or right after the introduction of the carbon black yielding feedstock in the first stage. The amount of the Group IA or Group IIA metal containing substance can be any amount as long as a carbon black product can be formed. For instance, the amount of the substance can be added in an amount such that 200 ppm or more of the Group IA or Group IIA element is present in the carbon black product ultimately formed. Other amounts include from about 200 ppm to about 5000 ppm or more and other ranges can be from about 300 ppm to about 1000 ppm, or from about 500 ppm to about 1000 ppm of the Group IA or Group IIA element present in the carbon black product that is formed. These levels can be with respect to the metal ion concentration. As stated, these amounts of the Group IA or Group IIA element present in the carbon black product that is formed can be with respect to one element or more than one Group IA or Group IIA element and would be therefore a combined amount of the Group IA or Group IIA elements present in the carbon black product that is formed. The substance can be added in any fashion including any conventional means. In other words, the substance can be added in the same manner that a carbon black yielding feedstock is introduced. The substance can be added as a gas, liquid, or solid, or any combination thereof. The substance can be added at one point or several points and can be added as a single stream or a plurality of streams. The substance can be mixed in with the feedstock, fuel, and/or oxidant prior to or during their introduction.

One method by which a substance containing at least one Group IA or Group IIA element such as, for example, potassium can be introduced into the feedstock is by the incorporation of the substance into the feedstock. Upon combustion, the metal ions can become uniformly incorporated into the carbon black. The charge of metal ions provides a repulsive force between individual carbon black particles. This repulsive force can keep particles from aggregating, thus decreasing the overall structure of the carbon black.

The application of additional feedstock to the preexisting carbon black particles may be repeated any number of times until the reaction of feedstock to carbon black ceases. Each time additional feedstock is added, the temperature of the entire reaction mixture generally goes down, and carbon black particle size increases. In this way the feedstock can act as a quenching agent for the cooling of the carbon black.

In another embodiment of the present invention, the present invention also relates to a method of making a carbon black product wherein a carbon black yielding feedstock is introduced in a first stage and combined with a stream of hot gases to form a precursor. Furthermore, a second carbon black yielding feedstock is subsequently introduced downstream to the precursor. Thus, this method is, up to this point, the same as the above-described embodiment and therefore the same conditions and examples would apply to this process. Furthermore, in this process, the second carbon black yielding feedstock contains at least 15% by weight of the total amount of the carbon black yielding feedstock utilized during the entire process. The second carbon black yielding feedstock can contain from about 15% by weight to about 80% by weight of the total amount of the carbon black yielding feedstock utilized during the entire process. Other ranges include from about 25% to about 70% or from about 30% to about 60% by weight of the total amount by weight of the carbon black yielding feedstock utilized during the entire process. The introduction of the second carbon black yielding feedstock can be introduced in two or more segments, or stages wherein the segments can be downstream from the first segment. This is quite different from previous multi-stage processes where any subsequent introduction of a carbon black yielding feedstock would be a very low amount such as on the order of 10% by weight or lower. This large amount of the second carbon black yielding feedstock leads to beneficial carbon black products as to be described later. Also, this amount of carbon black can serve as a partial quenching of the reactions that are occurring.

As in the first described process, a substance that is or contains a Group IA or Group IIA element or ion thereof can be added in the same manner as described above. These above-described details apply equally here.

In another embodiment of the present invention, the present invention relates to a process of making a carbon black product wherein a first carbon black yielding feedstock is introduced in a first stage and combined with a stream of hot gases to form a precursor as with respect to the first and second above-described processes. A second carbon black yielding feedstock is then introduced to the precursor and in this process, no oxidizing source and no fuel source are introduced after formation of the precursor. Thus, in this process, any oxidizing source and/or fuel source are only introduced prior to the introduction of the first carbon black yielding feedstock or during the introduction of the first carbon black yielding feedstock. Again, this is quite different from previous processes where typically, if a second carbon black yielding feedstock is introduced; sufficient fuel and an oxidizing source are added to promote sufficient pyrolysis of the second carbon black yielding feedstock. Again, as with the previous processes, at least one Group IA or Group IIA metal containing substance can be introduced in the same manner as described above and these details apply equally here.

In another embodiment of the present invention, the present invention relates to a process of making a carbon black product wherein a precursor containing a first carbon black is formed in a first temperature zone of a carbon black reactor and then a carbon black yielding feedstock can be introduced to the precursor. The method then involves forming a carbon black product in a second temperature zone which is located before a quench zone. In this process, the first temperature zone and the second temperature zone have a temperature difference of 200° C. or more, and preferably a temperature difference of 300° C. or more. Suitable ranges with respect to the temperature difference can be, for instance, from about 200° C. to about 900° C. or from about 400° C. to about 700° C. Other temperature ranges with regard to the temperature difference can be used. Generally, with respect to this temperature difference, the first temperature zone has the higher temperature and the second temperature zone has the lower temperature thus creating the temperature difference though this is a preferred embodiment only. The difference in temperatures can be achieved any number of ways such as avoiding any further introduction of combustion gases or avoiding or minimizing formation of combustion gases in the second temperature zone. Other means to achieve this difference can be used. Again, as with the previous embodiments, a Group IA or Group IIA metal containing substance can be used and introduced in the same manner as described above and the details as set forth above apply equally here. Preferably, the Group IA or Group IIA metal containing substance is introduced in the first temperature zone or at least before the quench zone. As an option, the Group IA or Group IIA metal containing substance can be introduced during or prior or both during and prior to the formation of the precursor. In addition, in this process, a carbon black yielding feedstock can be introduced to the precursor.

With respect to the above processes, one or more features of the processes can be used in a single process. For instance, the second carbon black yielding feedstock can be used to partially quench and the first and second temperature zone difference can be 200° C or more. Any combination of process features as described herein can be combined.

In the embodiments which involve achieving a difference in temperature of 200° C. or more with respect to the first temperature zone and the second temperature zone, and in any other of the embodiments described herein, any means to reduce the temperature between the temperature zones or zones where the first carbon black yielding feedstock is introduced compared to where the second carbon black yielding feedstock is introduced can be used. For instance, a water jacket can be used around the reactor (or parts thereof) where the second carbon black yielding feedstock is introduced or thereafter. In the alternative, or in combination, steam can be introduced at this point. In addition, or in the alternative, other quench agents, such as nitrogen, water, or other suitable quench agents, can be used to achieve a reduction in temperature at the point of where the second carbon black yielding feedstock is introduced or thereafter. Preferably, there is no water jacket or other quench devices or means in the first temperature zone in any of the embodiments of the present invention and preferably any such quenching occurs just prior, during, or right after introduction of the second carbon black yielding feedstock.

Furthermore, with respect to the above processes, preferably, in the first stage where the first carbon black yielding feedstock is introduced, the goal is to maximize surface area. For instance, in the first stage, it is preferably operated to achieve a high surface area such as from about 100 to about 400 $m^2/g$ based on BET.

In one embodiment of the present invention, the first carbon black yielding feedstock which forms the precursor is eventually coated by the subsequent carbon black yielding feedstock which vaporizes and coats the precursor.

Beneficial carbon black products can be formed, for instance, a carbon black having a DBP range of from about 120 to about 150 cc/100 g with a total Group IA or Group IIA metal content of from about 50 to about 150 ppm can be formed. Other DBP ranges include from about 90 to about 120 cc/100 g with a total Group IA or Group IIA metal content of from about 100 to about 500 ppm; a DBP range of from about 60 to about 90 cc/100 g with a Group IA or Group IIA metal containing content of from about 200 to about 1,000 ppm; a DBP range of from about 30 to about 60 cc/100 g, with a total Group IA or Group IIA content of from about 500 ppm to about 5,000 ppm. The carbon black of the present invention can have a leachable amount of the Group IA or Group IIA metal. For instance, the carbon black can have a leachable Group IA or Group IIA metal content of about 20% or less by weight of the Group IA or IIA element present, and more preferably 15 weight % or less, 10 weight % or less, 5 weight % or less, 1 weight % or less, or ½ weight % or less. Ranges include, but are not limited to, about 0 weight % to about 20 weight % or about 0.25 weight % to about 10 weight %. The leachable amount can be determined by soxhlet extraction of the carbon black followed by analysis of the aqueous extract for potassium, similar in concept to ASTM methods D4527, C871, or EPA methods SW8-1311 and SW8-1312. In addition, the carbon black can have any porosity amount. The carbon black can have a BET surface area (in $m^2/g$) to t-area (in $m^2/g$) ratio of 1.5 or less, such as 0.9 to 1.5. In general, preferably, the carbon blacks of the present invention have low levels of microporosity. Also, the carbon black can have a t-area of from about 10 $m^2/g$ to about 180 $m^2/g$. Other ranges include from about 30 $m^2/g$ to about 150 $m^2/g$ and from about 50 $m^2/g$ to about 120 $m^2/g$. Generally, the carbon black of the present invention contains no appreciable amount of silicon.

The carbon black of the present invention can be used in any product where conventional carbon black is used such as rubber products, tires, inks, ink jets, toners, gas diffusion electrodes, coatings, plastics, polymers, and the like.

The present invention will be further clarified by the following examples, which are intended to be purely exemplary of the present invention.

EXAMPLES

In a pilot plant, one embodiment of the carbon black of the present invention was made. In this process, a carbon black reactor, illustrated in FIG. 1 and having a design similar to that set forth in U.S. Pat. No. 6,403,695, was used. Examples 1-7 are outlined in Table 1. In each case, a primary combustion of 140% was used wherein this amounts to 40% of an oxygen rich combustion reaction. The primary fuel for the combustion reaction was natural gas and introduced to the reactor in Stream 1. The natural gas fed to the carbon black forming process was about ambient temperature of approximately 77° F. The liquid feedstock utilized was a commercially available feedstock having the typical properties listed in U.S. Pat. No. 5,190,739. In this process, the first carbon black containing feedstock was introduced at a first stage in the presence of a stream of hot gases formed by a primary combustion. The first carbon black yielding feedstock was introduced to the process in the varying amounts as shown in Table 1. Once the first carbon black yielding feedstock in the first stage was combined with a stream of hot gases to form a precursor which contained a first carbon black, a second carbon black yielding feedstock was then subsequently introduced downstream. This second carbon black yielding feedstock was introduced without any oxidizing source or fuel source present and was introduced before the quench zone.

TABLE 1

Example operating conditions

|  | 1 | 2 | 3 | 4 | 5 | 6 | 7 |
|---|---|---|---|---|---|---|---|
| Air rate, $Nm^3/hr$ | 1800 | 1800 | 1800 | 1800 | 1800 | 1800 | 1800 |
| Air preheat temp, ° C. | 500 | 500 | 500 | 500 | 500 | 500 | 500 |
| Overall combustion, % | 21 | 21 | 21 | 21 | 23 | 21 | 21 |
| Primary combustion, % | 140 | 140 | 140 | 140 | 140 | 140 | 140 |
| Total Feedstock rate, kg/hr | 722 | 722 | 722 | 722 | 650 | 722 | 722 |
| FDS temp, ° C. | 179 | 169 | 141 | 148 | 158 | 145 | 149 |
| K+ (as potassium acetate solution), mg K+/kg FDS | 0 | 500 | 0 | 500 | 600 | 800 | 844 |
| STSA, $m^2/g$ | 62.4 | 71.7 | 78.5 | 86.6 | 84.8 | 82 | 97.1 |
| BET, $m^2/g$ | 63.7 | 69.1 | 76.4 | 86.2 | 87.2 | 84 | 94.2 |
| DBPA, cc/100 g | 125.3 | 43.5 | 167.4 | 132.3 | 168.9 | 143 | 108 |
| Quench temperature, ° C. | 730 | 730 | 730 | 730 | 730 | 730 | 730 |
| Quench location, m | 16.7 | 16.7 | 16.7 | 13.1 | 14.3 | 14.3 | 13.1 |
| Intermediate water, kg/hr | 0 | 0 | 0 | 0 | 100 | 0 | 0 |
| Percent feedstock in first location | 100 | 100 | 47 | 47 | 53 | 47 | 47 |
| Number of second stage injection locations | 0 | 0 | 1 | 1 | 1 | 2 | 1 |
| Distance between injections 1 and 2, m (L2 in FIG. 1) | 1.6 | 1.6 | 1.6 | 1.6 | 1.6 | 1.6 | 1.6 |
| Temperature difference between injections 1 and 2, ° C. | N/A | N/A | −336 | −334 | −437 | −331 | −334 |

In Example 5, an amount of water was introduced between the two feedstock injections in the amount of 100 kg/hr. This water was introduced as a fine spray by means of an pressurized atomizer.

In Example 6, the second carbon black yielding feedstock was split into two equal amounts. The first part was introduced at L1 of FIG. 1 as indicated in Table 1. The second part was introduced 1 m downstream.

During the introduction of the first carbon black yielding feedstock, a varied amount of potassium in the form of a potassium acetate solution was introduced to the precursor to have a potassium content.

The carbon black formed in the reaction was then completely quenched with water downstream of the second carbon black yielding feedstock to form the carbon black product of the present invention. The carbon blacks formed had a t-area, BET areas and DBP absorption shown in Table 1.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A process of making a carbon black product comprising
a) in a multi-stage carbon black reactor having a converging diameter section, forming a stream of hot gases at a stage having a diameter and at a location upstream of where any of carbon black yielding feedstock is introduced into said multi-stage carbon black reactor, b) downstream of said converging diameter section, forming a precursor consisting essentially of a first carbon black in a first carbon black formation site in said multi-stage carbon black reactor comprising introducing a first carbon black yielding feedstock and said hot gases into said first carbon black formation site, and c) downstream of where said first carbon black yielding feedstock is introduced, then introducing a second carbon black yielding feedstock to said precursor in a second carbon black formation site in said reactor and forming said carbon black product in said second carbon black formation site before a complete quench zone, and d) further comprising introducing at least one substance containing at least one Group IA or Group IIA element prior to and/or during introducing said second carbon black yielding feedstock, wherein said second carbon black formation site is located downstream from said first carbon black formation site in a direction of gas flow in the reactor, and wherein no oxidizing source and no fuel source for generating hot combustion gases is introduced after formation of said precursor, and wherein said first carbon black formation site and second carbon black formation site have a temperature difference ($\Delta$) of 200° C. or more as determined from respective first and second temperatures determined in the reactor where the first and second carbon black yielding feedstocks are respectively introduced in the reactor, and wherein said second carbon black yielding feedstock is at least 15% by weight of the total amount by weight of carbon black yielding feedstock, wherein the first carbon black yielding feedstock and second carbon black yielding feedstock are introduced at stages of the multi-stage carbon black reactor having diameters that are narrower than the diameter of the stage of where said stream of hot gases is formed; and said carbon black product consisting essentially of a carbon black having a DBP in a range of from about 30 to about 150 cc/100 g and an STSA in a range of from 10 to 180 $m^2/g$.

2. The process of claim 1, wherein said temperature difference is 300° C. or more.

3. The process of claim 1, wherein said temperature difference is from 200° C. to about 900° C.

4. The process of claim 1, wherein said temperature difference is from about 400° C. to about 700° C.

5. The process of claim 1, wherein said temperature difference is obtained at least in part by a cooling jacket, water spraying, and/or steam in between said first and second temperature zone.

6. The process of claim 1, wherein a first injection location for said introducing of said first carbon black yielding feedstock is about 1.6 m upstream of a second injection location for said introducing of said second carbon black yielding feedstock to said precursor in said reactor.

* * * * *